(No Model.)
J. BARDSLEY.
KNOB ATTACHMENT.
No. 350,714. Patented Oct. 12, 1886.
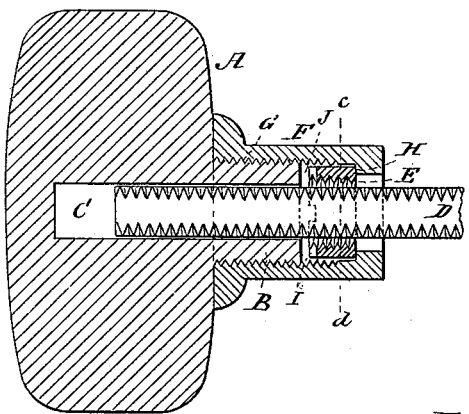
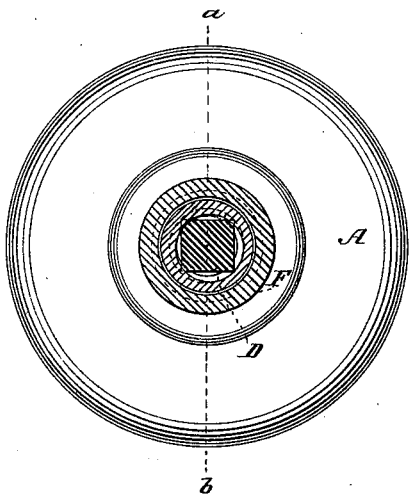
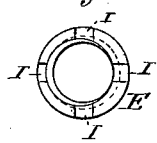
WITNESSES:
Edward Wolff
A. Shaw
INVENTOR
Joseph Bardsley,
BY
Ellison & Gill,
ATTORNEYS.

UNITED STATES PATENT OFFICE.

JOSEPH BARDSLEY, OF NEWARK, NEW JERSEY.

KNOB ATTACHMENT.

SPECIFICATION forming part of Letters Patent No. 350,714, dated October 12, 1886.

Application filed June 1, 1886. Serial No. 203,736. (No model.)

*To all whom it may concern:*

Be it known that I, JOSEPH BARDSLEY, a citizen of the United States, and a resident of Newark, in the county of Essex and State of New Jersey, have invented certain new and useful Improvements in Knob Attachments, of which the following is a specification.

The invention relates to devices for attaching knobs to their spindles; and it consists in a novel means, hereinafter described, by which the knob and spindle may be securely connected together without the aid of the transverse pins or screws customarily employed in the shank of the knobs heretofore in use.

Referring to the accompanying drawings, forming a part of this specification, Figure 1 is a central vertical longitudinal section of one knob, spindle, and connecting devices embodying the invention, the section being taken on the dotted line $a\,b$ of Fig. 2, which is a sectional view on the dotted line $c\,d$ of Fig. 1; and Fig. 3 is a detached view of one element of the construction shown in Fig. 1, and hereinafter referred to.

In the drawings, referring to Figs. 1 and 2, A designates the door-knob; B, the externally-threaded shank thereof, and C a recess passing through the shank and into the knob a suitable distance to receive the end of the usual spindle, D. Upon the spindle D is applied the internally-threaded stop E, which is inclosed by the coupling-sleeve F, the latter being provided at one end with the internal thread, G, to engage the male thread on the knob-shank, and at the other end with the annular shoulder H, which, when in use, bears against the outer end of the stop E, as shown in Fig. 1. The inner end of the stop E is provided with notches I, (shown in Fig. 3,) of suitable form to receive the end of a pointed instrument and permit a rotary action of same to revolve the stop on the spindle D and within the coupling-sleeve F, as hereinafter specified.

In adjusting and securing the knob by means of the devices illustrated in Fig. 1, said coupling-sleeve is first passed upon the spindle D to a proper position with relation to the thickness of the door, and the stop E then applied upon said spindle and screwed within the coupling-sleeve F until it comes in contact with the annular shoulder H, after which the knob A is slipped upon the end of the spindle until its shank B meets the thread G at the outer end of the sleeve F, whereupon the said sleeve is rotated for the purpose of causing its thread to engage the thread on the shank B and draw the latter into it until the inner face of the knob checks all such further movement. The knob during this longitudinal movement does not rotate, but simply travels inward on the spindle, the end of the latter gradually passing into the recess C, while the shank B is being drawn inward into and by the rotating sleeve F, which is prevented from having any longitudinal movement by the stop E. The shank B is of such length with regard to that of the sleeve F that a small space, J, is left between the end of the stop and the shank for the purpose of permitting the turning of the sleeve until it firmly binds against the knob, without danger of the shank meeting the stop. The outer end of the sleeve F will preferably be enlarged laterally, as indicated, in order to produce a broad binding-surface, and to add to the ornamental character of the article.

In applying the stop E upon the spindle a pointed instrument, as above mentioned, may be used to cause the rotation of same after it has entered the sleeve F beyond the reach of the finger of the workman.

It will be observed that the arrangement of devices above specified effectually secures the knob without the use of the customary transverse pins or screws, which have always proven objectionable.

In handling the knob for the purpose of opening or closing the door the sleeve F and knob will not rotate, except conjointly with the spindle, in view of the latter being angular in cross-section and being seated in a correspondingly-formed recess in the knob, and hence there will be no danger of the parts becoming loosened or detached from each other.

What I claim as my invention, and desire to secure by Letters Patent, is—

In combination with the door-knob containing the plain-sided recess C, and having an externally-threaded shank, B, the threaded spindle entering said recess, the internally-threaded stop E on the spindle, and the internally-threaded coupling-sleeve F, which at one end engages the knob-shank and firmly impinges the knob, and at the other incloses the stop and has an inwardly-projecting shoulder, H, in contact with said stop, substantially as shown and described.

Signed at New York, in the county of New York and State of New York, this 29th day of May, A. D. 1886.

JOSEPH BARDSLEY.

Witnesses:
CHAS. C. GILL,
WILLIAM B. ELLISON.